US008645067B2

(12) United States Patent
Gallagher et al.

(10) Patent No.: US 8,645,067 B2
(45) Date of Patent: Feb. 4, 2014

(54) SYSTEM AND METHOD FOR DETERMINING ROAD CONDITIONS

(75) Inventors: Daniel R. Gallagher, Huntsville, AL (US); Robert J. Dreisewerd, Huntsville, AL (US); John N. McHenry, Candler, NC (US)

(73) Assignee: Baron Services, Inc., Huntsville, AL (US)

( * ) Notice: Subject to any disclaimer, the term of this patent is extended or adjusted under 35 U.S.C. 154(b) by 459 days.

(21) Appl. No.: 12/533,805

(22) Filed: Jul. 31, 2009

(65) Prior Publication Data

US 2011/0029243 A1 Feb. 3, 2011

(51) Int. Cl.
*G01W 1/02* (2006.01)

(52) U.S. Cl.
USPC . 702/3; 702/5; 702/99; 702/130; 340/539.28; 340/601; 340/602; 340/905; 701/65; 701/415; 701/423

(58) Field of Classification Search
USPC ............... 702/3, 5, 99, 130; 340/539.28, 601, 340/602, 905; 701/65, 415, 423
See application file for complete search history.

(56) References Cited

U.S. PATENT DOCUMENTS

| 6,018,699 | A | 1/2000 | Baron, Sr. et al. |
| 6,275,774 | B1 | 8/2001 | Baron, Sr. et al. |
| 6,490,525 | B2 | 12/2002 | Baron, Sr. et al. |
| 6,493,633 | B2 | 12/2002 | Baron, Sr. et al. |
| 7,139,664 | B2 | 11/2006 | Kelly et al. |
| 2003/0178501 | A1 | 9/2003 | Doherty |
| 2004/0043760 | A1 | 3/2004 | Rosenfeld et al. |
| 2008/0042813 | A1* | 2/2008 | Wheatley et al. ............. 340/435 |

OTHER PUBLICATIONS

U.S. Appl. No. 12/256,023, filed Oct. 22, 2008, Jones et al.
Mass, A Next-Generation Land Surface Model for the Prediction of Pavement Temperature, Final Report Research Project T1803, Task 44 Pavement Temperature, prepared for Washington State Transportation Commission, Department of Transportation, Mar. 2003, USA.
Crevier and DeLage, METRo: A New Model for Road-Condition Forecasting in Canada, Journal of Applied Meteorology, Jun. 12, 2000, 2026-2037, vol. 40, American Meteorological Society.

(Continued)

*Primary Examiner* — Alexander H Taningco
*Assistant Examiner* — Paul D Lee
(74) *Attorney, Agent, or Firm* — Stephen H. Hall; Jeremy A. Smith; Bradley Arant Boult Cummings LLP

(57) ABSTRACT

A road data apparatus is disclosed that predicts road conditions comprising a land surface data generator which derives a land surface data output from a plurality of current and forecast weather and location data, said current and forecast weather and location data comprising surface temperature, subsurface temperature, and precipitation depth, a pavement data generator which derives a road temperature and a road condition from said land surface data output and a plurality of pavement generator input data, said plurality of pavement generator input data comprising road layer data; and a roadway status indicator generator which derives a roadway status indicator from said road temperature, road condition and precipitation data. In one embodiment, the roadway status indicator is communicated to an end user through a distribution network.

20 Claims, 5 Drawing Sheets

(56) References Cited

OTHER PUBLICATIONS

U.S. Army Corps of Engineers Cold Regions Research & Engineering Laboratory, SNTHERM: 1-D Energy Balance Model for Snow and Soil, Fact Sheet, Jul. 2004, USA.

Frankenstein and Koenig, Fast All-season Soil STrength (FASST), Sep. 2004, ERDC/CRREL SR-04-1 U.S. Army Corps of Engineers Engineer Research and Development Center Cold Regions Research and Engineering Laboratory, USA.

Velasquez, Marasteanu, Clyne, and Worel, Improved Model to Predict Flexible Pavement Temperature Profile, Third International Conference on Accelerated Pavement Testing, Oct. 1-3, 2008, Spain.

National Center for Atmospheric Research, Research Applications Laboratory, A Comparison of Road Temperature Models: FASST, METRo, and SYNTHERM, Prepared for Federal Highway Administration Office of Transportation Operations, Road Weather Management Program, Aug. 3, 2007, Version 2.0, USA.

* cited by examiner

SYSTEM AND METHOD FOR DETERMINING ROAD CONDITIONS

FIELD OF THE INVENTION

The invention relates generally to a system and method for determining and communicating a roadway status indicator, or road condition, to an end user.

SUMMARY OF THE INVENTION

In one aspect, the present disclosure provides a computer implemented method of determining a road temperature and road condition, comprising the steps of: collecting a plurality of weather data; collecting a plurality of location data; deriving a plurality of land surface data from said weather and location data; and deriving a road temperature and road condition from said land surface data and a plurality of pavement generator input data, wherein the above identified steps are performed on a computer. In other aspects, the present disclosure provides a road data system, wherein the system comprises a software or firmware encoded on a tangible media operated on by one or more processors, said processors being programmed to perform the steps of: collecting a plurality of current and forecast weather and location data; deriving a land surface data output from said current and forecast weather and location data; and deriving a road temperature and road condition from said land surface data and a plurality of pavement generator input data. In yet other aspects the present disclosure provides a road data apparatus that predicts road conditions comprising: a land surface data generator which derives a land surface data output comprising surface temperature, subsurface temperature, and precipitation depth, from a plurality of current and forecast weather and location data; a pavement data generator which derives a road temperature and a road condition from said land surface data output and a plurality of pavement generator input data said plurality of pavement generator input data comprising road layer data; and a roadway status indicator generator which derives a roadway status indicator from said road temperature, road condition and precipitation data.

BACKGROUND ART

Weather has broad and significant effects on the roadway conditions. Snow, rain, fog, ice, freezing rain, and other weather conditions can impair the ability of drivers to operate their vehicles safely, significantly reduce roadway capacity, and dramatically increase travel times. Roadway conditions, including high-quality weather information about the roadway environment, including both current observations and forecasts, communicated in a timely and effective manner can help drivers to make better decisions regarding travel plans and to react properly when faced with potentially compromised conditions.

Various meteorological modeling systems are known in the art, for example, pavement models and land surface models. Pavement models utilize certain meteorological data (for example, air temperature, dew point, pressure, precipitation data, cloud cover, and wind) and roadway data (for example, road type, surface condition, surface and subsurface temperatures) as inputs. These pavement models provide certain outputs that may include road surface and subsurface temperature, quantity of liquid or frozen precipitation on the road, and road condition.

A land surface model ("LSM") is a hydrological model used for meteorological applications and provides data related to the fate of precipitation after it reaches the ground. LSMs provide temperature and moisture characteristics of various soil layers. An LSM may use land use/land cover (for example, urban, agricultural, forests, wetlands, bodies of water, and seasonal variability), soil characteristics (for example, clay, sand, silt, and loam), topography, and atmospheric data (for example, high-resolution mesoscale models, observations, and radar) as inputs to determine the amount of precipitation run-off in a particular location. Traditionally, these LSMs are used by meteorologists to predict potential outcomes, for example flooding, resulting from hazardous precipitation, which are then often communicated to the general public by radio or television announcements.

Pavement models and LSMs both have beneficial uses and provide valuable data. However, both models have limitations on the data they provide, and the inputs on which the derived data is based. More specifically, pavement models and LSMs have traditionally been utilized for completely different analysis and to provide completely different outputs. To date, there has been no method or system that incorporates the benefits, and best aspects of a land surface model output data and the pavement model output data to communicate potentially dangerous road conditions to a driver. Neither the LSM nor the pavement model alone allow for accurate communication of dangerous road conditions to a driver. The LSM, while deriving data such as snow pack depth for a particular location, would fail to consider the effect of the location being a paved roadway versus a rural field. The LSM would be further frustrated by the many different pavement types encountered today, including asphalt, concrete and bridges. While an LSM operates on a continuous basis across the continental United States, pavement models known in the art do not. Instead, a pavement model derives a pavement forecast for a single point, which is insufficient as it cannot track the fate of precipitation from surrounding areas after it has fallen to the ground. As is known to those of skill in the art, precipitation may pool or collect in certain locations and such pooled precipitation may present hazards to drivers. This pooled precipitation may also flow into neighboring areas and present an unexpected hazard to drivers.

It is desirable to have a system and method to report the status or condition of roadways to drivers so that they may proceed safely along the roadway. It is also desirable that said roadway status or condition be derived from the most pertinent data from many sources, including a land surface data output. One advantage of the using the land surface data output in generating the roadway status or condition is that the land surface output data provides more accurate prediction of the amount of precipitation on a roadway by taking into account what happens to the precipitation after it has reached the ground, including areas where precipitation is likely to accumulate due to terrain topography and soil conditions. It is also desirable that the system and method report the status or condition of roadways to drivers in an easy to understand manner.

BRIEF DESCRIPTION OF DRAWINGS

It should be noted that identical features in different drawings are shown with the same reference numeral.

DETAILED DESCRIPTION

In one aspect, the present disclosure is directed to computer implemented roadway data system and method that determines and communicates a roadway status indicator to an end user.

Figure 1:
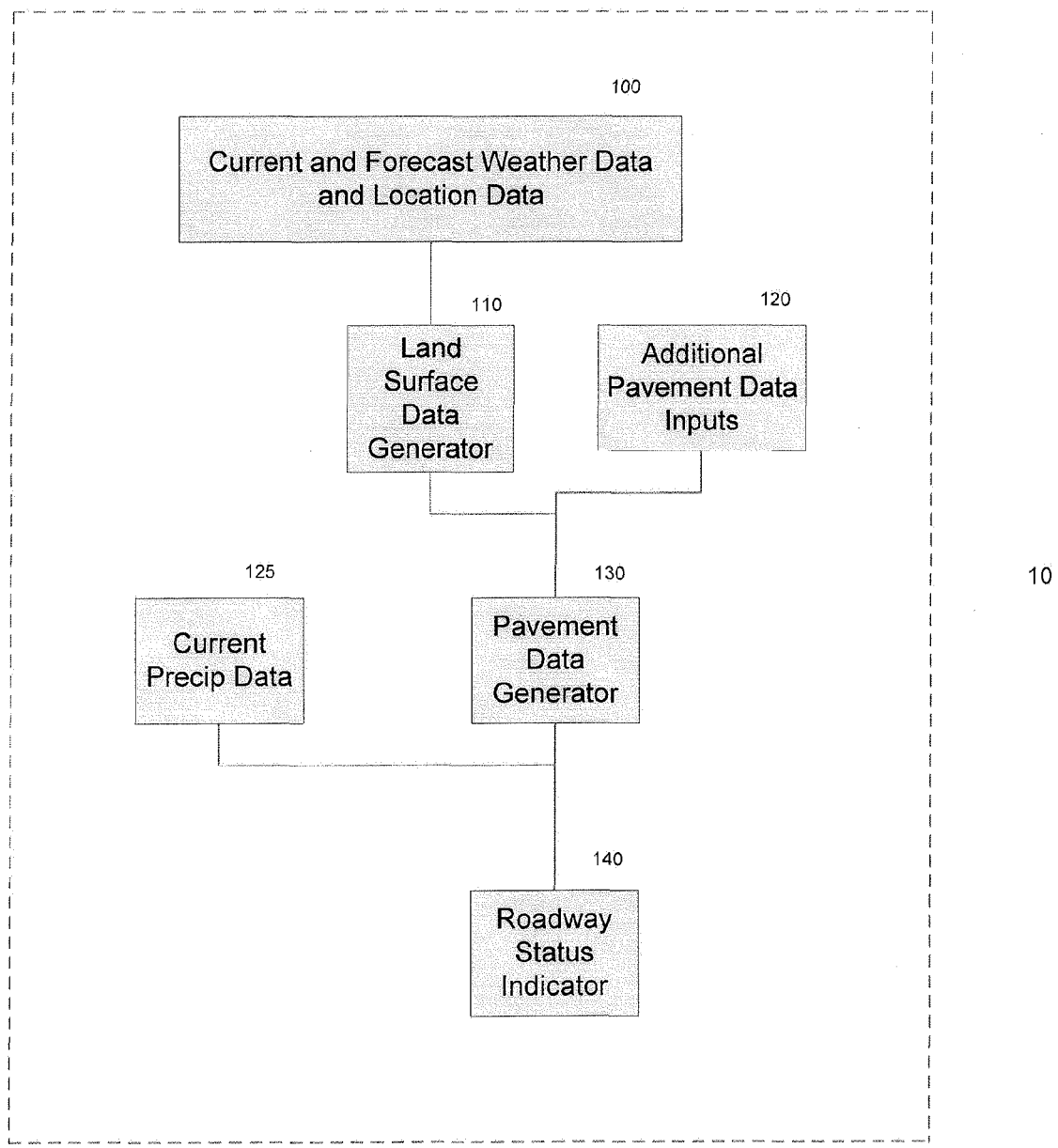
FIG. 1 shows one embodiment of the flow of data through the roadway data system.

Referring to FIG. 1, one embodiment of a roadway data system 10, in its most basic configuration, is disclosed. Current and forecast weather data and location data 100 is provided as input into a land surface data "LSD" generator 110. Output from the LSD generator 110 is combined with additional pavement data inputs 120 as input to a pavement data generator 130. The output from the pavement data generator 130, in turn, is combined with current precipitation data 125 to generate a roadway status indicator 140.

In one embodiment, the current precipitation data 125 includes a current precipitation rate value and a current precipitation type indicator. In one embodiment, the current precipitation data 125 includes a current precipitation rate value which is calculated by Baron Services, Inc.'s HYDRO computer program which provides very detailed quantitative precipitation measurements. In one embodiment, the current precipitation type indicator is calculated by Baron Services, Inc.'s Snow Mask program which differentiates between areas of snow, rain and mixed precipitation. Other methods of determining the current precipitation type indicator and the current precipitation rate value are available and are known to those skilled in the art, including various mesoscale models. By way of a non-limiting example, a NEXRAD or Doppler radar return may indicate, through use of algorithms such as a Z-R relationship or other similar algorithms known to those of skill in the art, that a location is receiving precipitation at a rate of 1.00 inch per hour (i.e., the current precipitation rate value) and the current precipitation type indicator would then calculate the type of precipitation falling at the location based upon a vertical profile of air temperature, humidity and other atmospheric factors. So, if the air temperature were 24 degrees F. near the surface and below freezing throughout the vertical extent of the atmosphere, the current precipitation data 125 might indicate that a particular location is receiving snow at the rate of 1.00 inch per hour.

Figure 2:
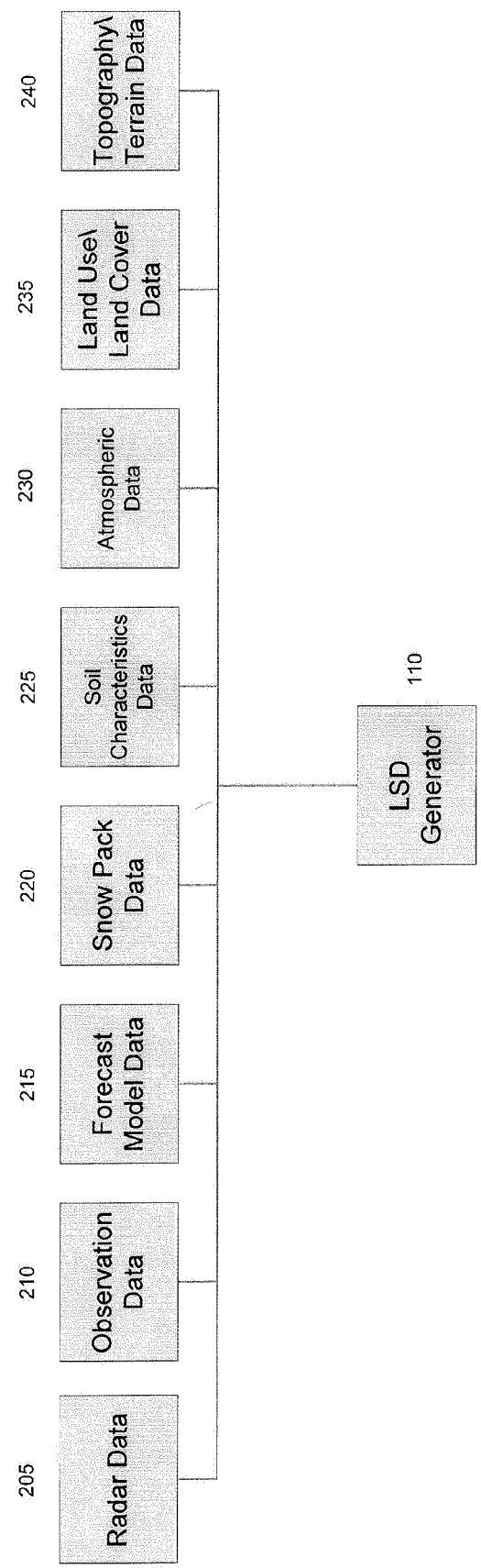
FIG. 2 shows one embodiment of the inputs to the land surface data generator.

Referring now to FIG. 2, more detail is provided regarding the types of information that may be included in the current and forecast weather data and location data 100, and that are provided as input into the LSD generator 110. As depicted in FIG. 2, optional input elements include radar data 205, observation data 210, forecast model data 215, snow pack data 220, soil characteristic data 225, atmospheric data 230, land use/land cover data 235, and topography/terrain data 240. Subsets of the forgoing data, or additional data, may be used as inputs to the LSD generator 110, and would be understood to those of skill in the art.

Radar data 205 can be any type of derived radar data, but will often be a byproduct of NEXRAD Doppler radar data, which may be adjusted by meteorologists or algorithms to only include precipitation that is reaching the ground. The radar data can be processed by a number of systems known in the art to obtain various information regarding current precipitation. Observation data 210 may include air temperature sensors, road surface temperature sensors, data from a (i) road weather information system ("RWIS"), (ii) an aviation weather report such as METAR and (iii) local governmental agencies, and other similar sources of current meteorological conditions. This information can be automatically provided and input, or it can be manually input. Forecast model data 215 can be generated from any number of forecast models known in the art. Snow pack data 220 can include information related to the amount of snow on the ground. Soil characteristic data 225 includes soil types, for example, silt, clay, sand, loam, etc, and are available in databases known to those of skill in the art. The optional atmospheric data 230 may include shear events, hail events, precipitation (type and intensity), lightning, visibility, wind, sky conditions, temperature, precipitation forecasts. The land use/land cover data 235 includes information regarding the site location, for example, is the site urban, agricultural, forest, wetlands, bodies of water and seasonal variability and are available in databases known to those of skill in the art. The topography/terrain data 240 includes information on how flat or hilly a particular area may be and are available in databases known to those of skill in the art.

Much of current and forecast weather data and location data 100 is provided in a grid format, or cell by cell basis. For example, much of the data may be provided in a particular resolution, for example a 1 km×1 km grid or cell, or a 7 km×7 km grid or cell. In other words, each grid cell may have radar data 205, observation data 210, forecast model data 215, snow pack data 220, soil characteristic data 225, atmospheric data 230, land use/land cover data 235, and topography terrain data 240 associated with it. This allows more site-specific determinations to be made about particular locations. This also allows the LSD generator 110 to likewise generate data according to a grid format or cell by cell basis.

Figure 3:
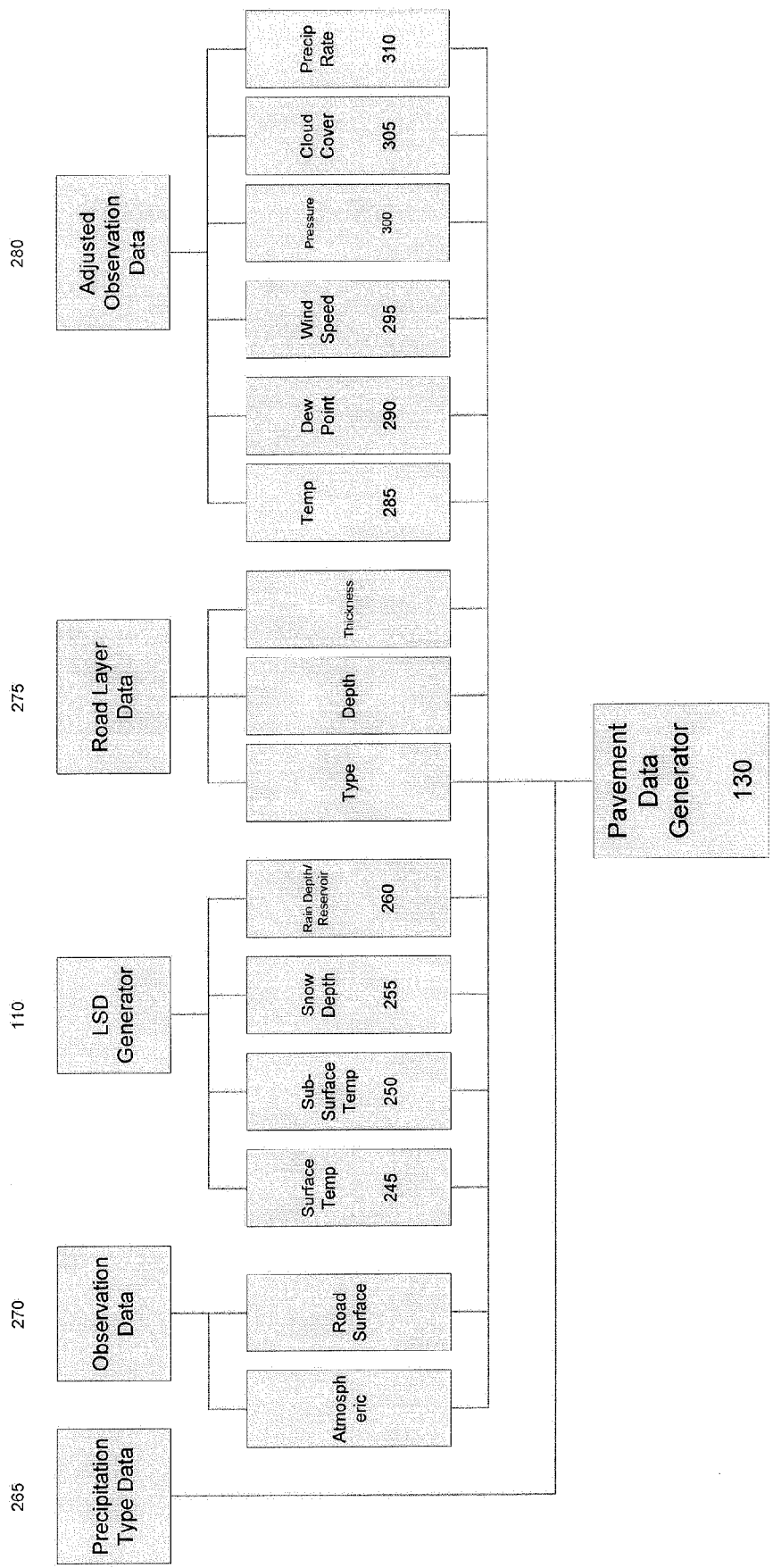
FIG. 3 shows one embodiment of the inputs to the pavement data generator.

Referring now to FIG. 3, the LSD generator 110 generates LSD output data, which may include surface temperature 245, subsurface temperature 250, snow depth 255, and rain depth/reservoir 260. The rain depth/reservoir data 260 estimates the water depth that remains on the land surface in, a particular location, and may include runoff from an adjacent area. LSD output data may include both current conditions, as well as forecasted conditions, i.e., the forecasted surface temperature 245 and subsurface temperature 250, snow depth 255 and rain depth/reservoir 260 over a configurable number of hours. These LSD output data are just a subset of the types of data that may be generated by the LSD generator 110, and other possible LSD output data would be known to those of skill in the art. However, one aspect of the invention is the use of the LSD output data as input into the pavement data generator 130, to generate a roadway status indicator 140.

As described above, the LSD output data provides input into the pavement data generator 130. As indicated in FIG. 1, additional pavement data inputs 120 are also preferably included. Additional pavement data inputs 120, as depicted in FIG. 3, may include precipitation type and rate data 265 (for example, liquid, mixed or frozen), observation data 270 (for example, atmospheric and road surface), road layer data 275 (for example, type (asphalt, concrete, gravel, etc.), depth, and thickness), and adjusted observation data 280 (for example temperature 285, dew point 290, wind speed 295, pressure 300, cloud cover 305, and precipitation rate 310). In one embodiment, the pavement data generator 130 receives RWIS data from public or private agencies or networks of these observations, such as the Meteorological Assimilation Data Ingest System ("MADIS") or Clams. MADIS is dedicated toward making value-added data available from the National Oceanic and Atmospheric Administration's (NOAA) Earth System Research Laboratory (ESRL) Global Systems Division (GSD) for the purpose of improving weather forecasting, by providing support for data assimilation, numerical weather prediction, and other hydrometeorological applications. Clarus is a similar initiative by the U.S. Department of Transportation's Federal Highway Administration (FHWA). The goal of the Clarus initiative is to create a robust data assimilation, quality checking, and data dissemination system that can provide near real-time atmospheric and pavement observations from the collective state's investments in road weather information systems. It will be understood by those of skill in the art that some of the current and forecast weather data and location data 100 used as inputs for the LSD generator 110 may the same or similar information used as inputs to the pavement data generator 130 (for example, the observation data 210 and observation data 270).

Similar to the current and forecast weather data and location data 100, the LSM output data and the additional pavement model inputs 120 may be provided on a grid, or cell by cell, basis. For example, a 1 km×1 km cell may have a surface temperature of 30 degrees, a subsurface temperature of 32 degrees, a snow depth 2 inches, and rain depth/reservoir of 0 inches. Other pavement model data 120 can be utilized, or some of the foregoing can be eliminated, as would be understood to those of skill in the art. In one embodiment, the LSM output data and additional pavement data inputs 120 are used as inputs into a pavement data generator 130.

It will be understood by those of skill in the art that a particular cell will not have uniform data across the cell. For example, a cell may generally be rural, but have some paved areas, or may generally be hilly, but have some flat areas. Obviously, the smaller the grid cells used, the more accurate the identifier (for example soil type or topography) will be. In one embodiment, the current and forecast weather data and location data 100 is weighted so that the "worst case" scenario is accounted for. For example, if hilly terrain is more likely to result in dangerous road conditions than flat terrain, a particular cell that has both types of topography will be designated as "hilly" to account for the worst case scenario. Similarly, if an area has some locations with heavy vegetation and some locations with sparse vegetation, the area may be allocated a "sparse vegetation" designation to account for the worst case scenario. As discussed more fully below, other "worst case" scenarios are utilized in determining the roadway status indicator 140. Likewise, if a cell has some light precipitation and some heavy precipitation, the heavy precipitation data may be used to generate a "worst case" scenario.

Figure 4:
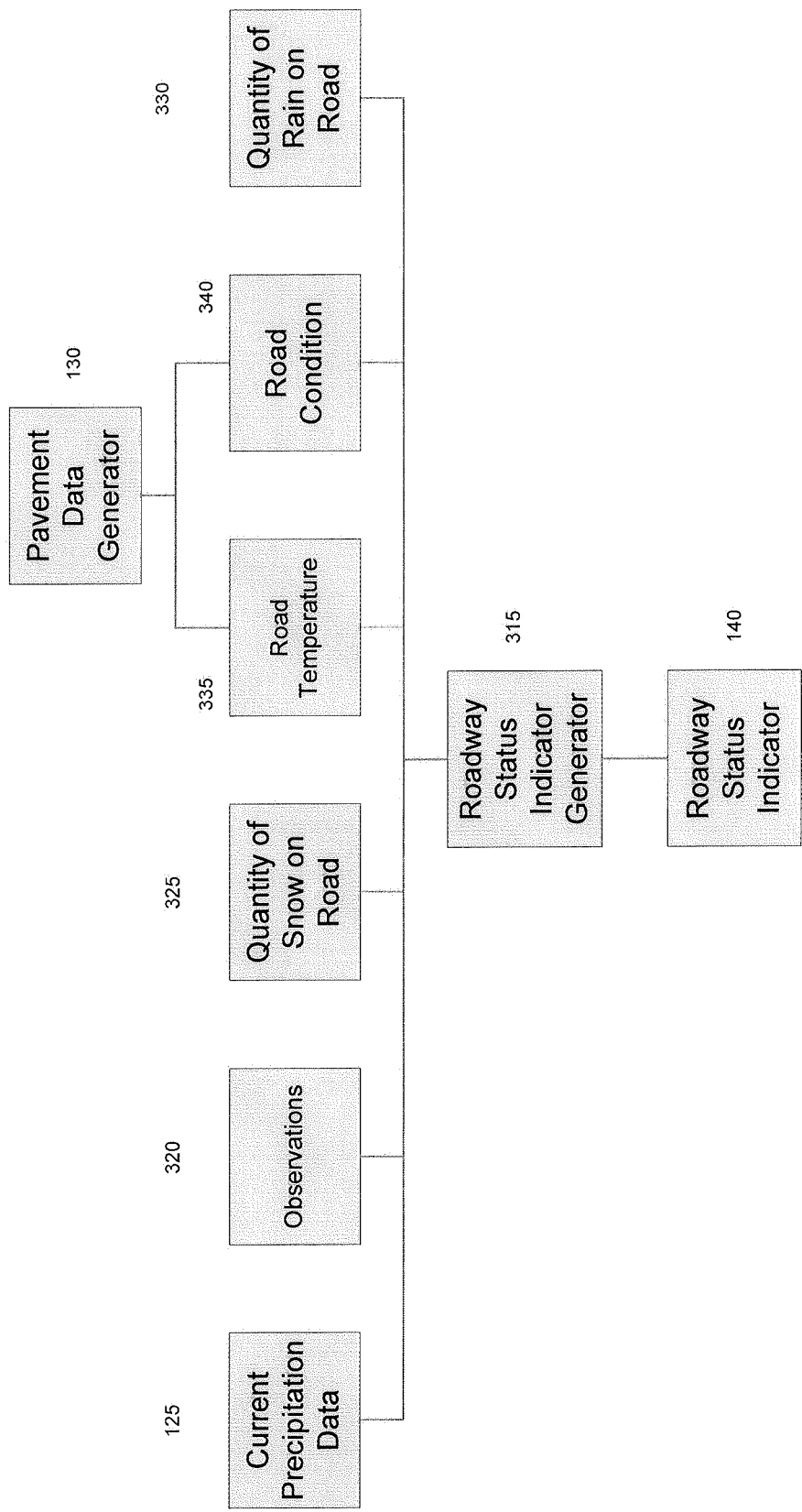
FIG. 4 shows one embodiment of the inputs to the roadway status indicator generator, which are ready for use in deriving the roadway status indicator.

As depicted in FIG. 4, the pavement data generator 130 may generate a road temperature 335 and road condition 340. In one embodiment, the pavement data generator 130 is an "energy balance model" pavement data generator 130. In one embodiment, the pavement data generator 130 is a variation of the METRo model. METRo stands for Model of the Environment and Temperature of Roads. METRo is a pavement model created in 1999 and distributed by Environment Canada. The model, amongst other things, predicts the roads conditions with particular interest such as: freezing rain, accumulation of snow, frost and thaw.

In one embodiment, the pavement data generator 130 typically "runs" three times per hour per cell, but may be run more or less depending on the atmospheric situation or available computing resources. In one embodiment, the pavement data generator 130 generates the above outputs for concrete road surfaces, asphalt road surfaces, bridges and any other type of road surface that may exist in an area. The pavement data generator 130 uses the worst case scenario for each surface type per cell in determining road temperature 335 and road condition 340. By way of non-limiting example, bridges, that typically ice over faster than roads, may result in result in the entire grid being designated as icy, even if most roadways will not be icy in a particular area. In one embodiment, the road condition 340 for a particular area (such as a grid cell) will be assigned as either being wet, covered with ice/snow (or a mix thereof), covered with dew, covered with melting snow, covered with frost, covered with freezing rain or clear/dry. In some embodiments, the road condition 340 may be communicated to an end user.

Road temperature 335 and road condition 340 may be combined with other data and input into a roadway status indicator generator 315. Other data input may include the current precipitation 125. Based on the current precipitation data 125, road temperature 335, and road condition 340 (both of which are output from the pavement data generator 130 using the LSD generator 110 as partial input), a roadway status indicator 140 is determined.

Other optional inputs into the roadway status generator 315 may include various observations (for example, atmospheric observations and road surface observations) 320, quantity of snow on the road 325, and quantity of rain on the road 330. Again, observations 320 may the same or similar to the data used as inputs to other aspects of the system (for example, observation data 210, 270). These values may be used as input into the roadway status indicator generator 315 if this information was not previously accounted for in the LSD generator 110, or if it is desired to bias the roadway status indicator 140 with this data. Estimated quantity of snow/rain 325,330 on the surface can be generated using models known to those of skill in the art. The roadway status indicator generator 315 processes the input information to generate a roadway status indicator 140. In the preferred embodiment, the roadway status indicator 140 can be (1) flooded, (2) icy, (3) heavy snow, (4) patchy ice, (5) snow, (6) slippery, or (7) clear. Additionally, the roadway status indicator may be (8) closed. Other roadway status indicators could also be used, and would be known to those of skill in the art.

The roadway status indicators 140 are preferably ranked in order of precedence, i.e., one road condition is more dangerous than another. The roadway status indicator 140 designations (1)-(7) above are ranked in the Applicant's preferred order (from most dangerous to least dangerous), but other orders may be chosen. A meteorologist is also able to override or bypass any automatically generated roadway status indicator 140. For example, it is common that a road will be closed by local emergency management personnel. In that case, the meteorologist operating the system can manually input or designate that a road (in a particular cell, or that may cover multiple cells) is closed or flooded. Such manual input may automatically result in the roadway status indicator 140 indicating that a road is "closed" or "flooded" Optionally, when the roadway status is "closed", the roadway status indicator 140 may also include an additional condition (for example, flooded or icy), that may be automatically generated as outlined above, or manually input by the meteorologist. Thus in some embodiments, more than one roadway status indicator 140 may be utilized for a particular cell.

Once the roadway status indicator 140 has been generated, it is desirable to communicate it to remote users that may be affected by the roadway status. Various options for distribution and communication are available.

Some the components of the above-described system may be implemented with computers. A computer may be any microprocessor or processor (hereinafter referred to as processor) controlled device, such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker.

The computer may be a uniprocessor or multiprocessor machine. Additionally, the computer includes memory such as a memory storage device or an addressable storage medium. The memory storage device and addressable storage medium may be in forms such as, by way of example, a random access memory (RAM), a static random access memory (SRAM), a dynamic random access memory (DRAM), an electronically erasable programmable read-only memory (EEPROM), a programmable read-only memory (PROM), an erasable programmable read-only memory (EPROM), hard disks, floppy disks, laser disk players, digital video disks, compact disks, video tapes, audio tapes, magnetic recording tracks, electronic networks, and other devices or technologies to transmit or store electronic content such as programs and data.

The computer executes an appropriate operating system such as Linux, Unix, Microsoft®Windows® 95, Microsoft® Windows® 98, Microsoft® Windows® NT, Apple® MacOS®, IBM® OS/20, and Palm® OS, and embedded operating systems such as Windows® CE or and the like. The computer may advantageously be equipped with a network communication device such as a network interface card, a modem, or other network connection device suitable for connecting to one or more networks.

The computer, and the computer memory, may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present invention. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The control logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The control logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also he understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in nonvolatile memory, such as, by way of example, read-only memory (ROM).

In some embodiments, features of the present invention can be implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

The computer used to implement the remote system, or the elements thereof, and described further below, may be an embedded microprocessor. For example, a cell phone or smart phone could also comprise an embedded microprocessor configured with control logic as described above to execute the functions of the remote system. The output/display system could then be the cell phone or smart phone visual display. Control of the remote system may be achieved by making the existing system buttons multipurpose.

Figure 5:
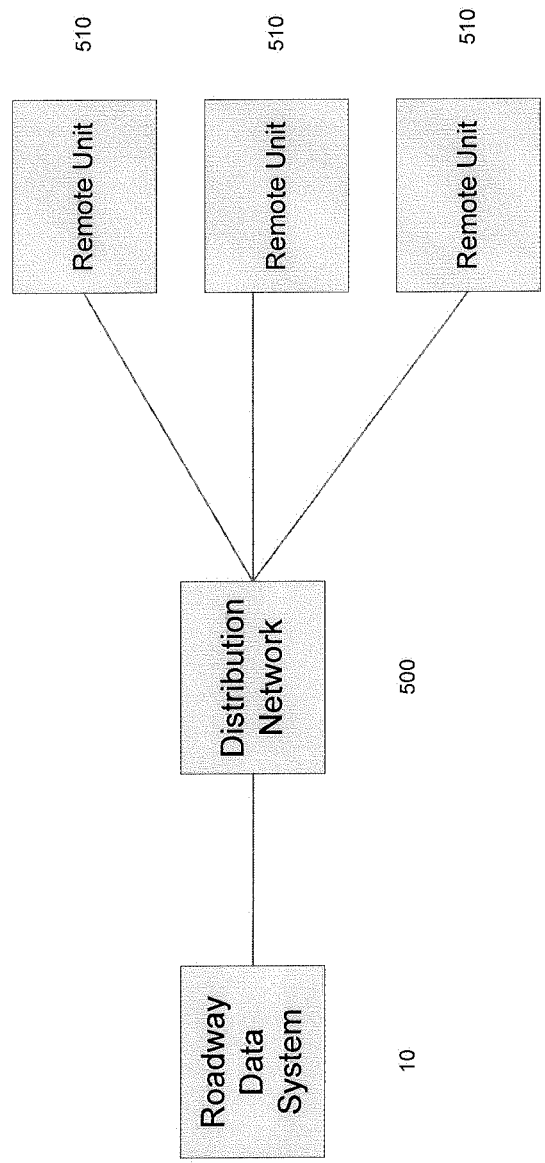
FIG. 5 shows one embodiment of relaying the roadway status indicator to the end user.

In one embodiment, depicted in FIG. 5, the roadway data system 10 is coupled to a distribution network 500, which in turn is in communication with one or more remote systems 510. As described above, the roadway data system 10 can generate a roadway status indicator 140 for various grid cells for a geographic location. The roadway status indicator 140 may be provided, or some derivative thereof via the distribution network 500, to the remote systems 510.

The distribution network 500 can be various types of networks, including but not limited to satellite radio networks (for example networks conducted by Sirius XM Satellite Radio), cellular, WI-FI, Super WI-FI, WI Max, 802.15, Bluetooth®, cable television, pager, landline, etc.

The remote system 510 may include a wireless network receiver to receive and decode signals transmitted over a wireless network 500. Where the distribution network 500 is not wireless, the remote system 510 would have an appropriate land-line counterpart depending on network connection protocols.

In one embodiment, the remote systems 510 include positioning capabilities, for example a Global Positioning System ("GPS") device that provides the geographic position of the remote system 510. The roadway status indicator 140 can be provided to the remote system 510 in a manner that associates the roadway status indicator 140 with a particular grid cell. The remote system 510 receives and processes the roadway status indicator 140 and associated grid cell. The remote system 510 receives and processes the roadway status indicator 140 and associated grid cell(s) to determine if the geographic location of the remote system 510, provided by the positioning capabilities, is affected by the roadway status indicator 140. Further disclosure of this embodiment is disclosed in co-owned, and pending patent application Ser. No. 12/256,023, incorporated herein by reference.

The remote system 510 may be a cellular phone, smart phone, hand-held computing device, lap top, or other similar device. The remote system 510 may be a unitary device, or in the alternative, may be implemented in a non-unitary arrangement of separate components. In all disclosed embodiments, the remote systems 510 can be configured to provide some type of visual or aural alert of conditions affecting them.

In an alternative embodiment, remote system 510 with positioning capabilities can track and transmit their locations to a central database, preferably co-located or in communication with the roadway data system 10. Similar systems and methods are known in the art, for example, U.S. Pat. No. 6,603,405, the disclosure of which is incorporated herein by reference. In this embodiment, the current location and forecasted location of the remote systems 510 can be compared to the roadway status indicators 140 of the various grid cells, and appropriate notices sent to the remote systems 510 via the distribution network 500.

In an alternative embodiment, a user can create a profile in a database that includes areas of interest to the user. For example, a user may designate his/her home, work, and vacation homes as a location of interest. Additionally, a user may designate an intended route of travel, for example a route from home to work on Mondays through Fridays or a particular vacation travel route. The database profile may also designate a communication protocol that the user may select, i.e. they want to be notified via e-mail, text message, phone call, etc. In this embodiment, the designated areas of interest and/or routes are compared to roadway status indicators 140 of the various grid cells corresponding to the areas of interest and/or routes, and appropriate notices send to the remote systems 510 via the distribution network 500. Similar systems for communicating other meteorological data, but not roadway status indicators 140 as described herein, are discussed in co-owned U.S. Pat. Nos. 6,018,699; 6,275,774; 6,493,633; and 6,490,525, and U.S. Pat. No. 7,139,664 owned by Weather Central, Inc., the disclosures of which are incorporated by reference.

In an alternative embodiment, the roadway data system 10 can be maintained and operated by a television broadcaster, or the roadway status indicator 140 associated with various grid cells provided to a television broadcaster. In this embodiment, the roadway status indicator 140 can be displayed to the viewing public in conjunction with maps. For example, various roadway status indicators 140 can be associated with a different color. White may be selected for snow, pink for patchy ice, and light blue for icy. The visual depictions may cover the entire viewing area (on a cell by cell basis) or just the various roadways may be depicted with the various color codes. Alternatively, areas with various conditions may be displayed with boxes or heavy lines around areas with different conditions. This embodiment could also be used in connection with the color coded areas.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A computer implemented method of determining a road temperature and road condition for an area having multiple types of roadway surfaces present within the area, comprising the steps of:
   a. collecting a plurality of weather data;
   b. collecting a plurality of land cover data, said land cover data including data indicative of whether a roadway is located in an urban, agricultural, forested or a wetland area;
   c. deriving a plurality of land surface data from said weather and land cover; and
   d. deriving a road temperature and road condition from said land surface data and a plurality of pavement generator input data, wherein said road condition is derived for multiple types of roadway surfaces in the area and the road condition that is reported to an end user through a distribution network is the most dangerous road condition derived for that area,
   wherein the above identified steps are performed on a computer.

2. The method of claim 1 further comprising collecting current precipitation data and deriving a roadway status indicator from current precipitation data and said road temperature and road condition.

3. The method of claim 1 further comprising the step of collecting observation data and current precipitation data and deriving a roadway status indicator from said road temperature, road condition, current precipitation data and observation data.

4. The method of claim 1 where said land surface data comprises surface temperature, subsurface temperature and precipitation depth.

5. The method of claim 1 wherein the plurality of pavement generator input data comprises road layer data.

6. The method of claim 1 wherein the plurality of pavement generator input comprises observation data.

7. The method of claim 1 wherein the road temperature and road condition are associated with a geographic grid cell.

8. The method of claim 1 further comprising the step of collecting a plurality of topographical data, said topographical data comprising data indicative of the amount of run-off precipitation in the area and further deriving the plurality of land surface data from the topographical data.

9. A road data system, wherein the system comprises a non-transitory tangible media containing software or firmware encoded thereon for operation by one or more processors, said processors being programmed to perform the steps of:
   a. collecting a plurality of current and forecast weather and land cover data for an area, the area having multiple types of roadway surfaces present within the area, said land cover data including data indicative of whether the area is urban, agricultural, forested or a wetland area;
   b. deriving a land surface data output from said current and forecast weather and land cover data;
   c. deriving a road temperature and road condition from said land surface data and a plurality of pavement generator input data, wherein said road condition is derived for multiple types of roadway surfaces in the area and the road condition that is reported to an end user through a distribution network is the most dangerous road condition derived for that area.

10. The road data system of claim 9 further comprising logic configured to collect current precipitation data and derive a roadway status indicator from said road temperature, road condition and current precipitation data.

11. The road data system of claim 10 further comprising logic configured to collect observation data and current precipitation data and derive a roadway status indicator from said road temperature, road condition, current precipitation and observation data.

12. The road data system of claim 9 where said current and forecast weather and location data comprises current precipitation data.

13. The road data system of claim 9 further comprising the step of collecting a plurality of topographical data, said topographical data comprising data indicative of the amount of run-off precipitation in the area and further deriving said land surface data from the topographical data.

14. The road data system of claim 9 wherein the road temperature and road condition are associated with a geographic grid cell.

15. A road data apparatus that predicts road conditions for an area comprising:
   a. a land surface data generator comprising a non-transitory tangible media containing software or firmware encoded thereon for operation by one or more processors, said processors being programmed to receive a plurality of current and forecast weather data and topography data inputs, and which derives a land surface data output from said plurality of current and forecast weather and topography data inputs, said land surface data output containing one or more of surface temperature, subsurface temperature, snow depth and rain depth, and wherein said topography data input to the land surface generator comprises data indicative of the amount of run-off precipitation in the area;
   b. a pavement data generator comprising a non-transitory tangible media containing software or firmware encoded thereon for operation by one or more processors, said processors being programmed to receive said land surface data output and a plurality of pavement generator input data and to derive a road temperature and a road condition, wherein said plurality of pavement generator input data comprises road layer data; and
   c. a roadway status indicator generator comprising a non-transitory tangible media containing software or firmware encoded thereon for operation by one or more processors, said processors being programmed to receive said road temperature, said road condition and precipitation data and to derive a roadway status indicator.

16. The apparatus of claim 15, wherein the land surface data generator derives a land surface data output from a plurality of data further comprising land cover data, said land cover data including data indicative of whether a roadway is located in an urban, agricultural, forested or a wetland area.

17. The apparatus of claim 15 where said pavement generator input data further comprises precipitation type data and observation data.

18. The apparatus of claim 15 wherein said apparatus is in communication with a distribution network for distributing said road status indicator.

19. The apparatus of claim 15 where said road temperature and road condition are associated with a geographic grid cell.

20. A computer implemented method of determining a road temperature and road condition for an area having multiple types of roadway surfaces present within the area, comprising the steps of:
   a. collecting a plurality of weather data, said weather data selected from the group consisting of radar data, observation data, forecast model data, snow pack data and atmospheric data;
   b. collecting a plurality of (i) land cover data, said land cover data including data indicative of whether the area is urban, agricultural, forested or a wetland and (ii) topography data, said topography data comprising data indicative of the amount of run-off precipitation in the area;
   c. deriving a plurality of land surface data from said weather, land cover and topographical data, where said land surface data is selected from the group consisting of surface temperature, subsurface temperature and precipitation depth;
   d. collecting current precipitation data;
   e. collecting a plurality of pavement generator input data, where said pavement generator input data is selected from the group consisting of road layer data and observation data;
   f. deriving a road temperature and road condition from said land surface data, current precipitation data and pavement generator input data, wherein said road condition is derived for multiple types of roadway surfaces in the area and the road condition that is reported to an end user through a distribution network is the most dangerous road condition derived for that area; and
   g. communicating said road temperature and road condition to an end user through a distribution network,
wherein the above identified steps are performed on a computer.

* * * * *